US011368652B1

United States Patent
Johnson et al.

(10) Patent No.: US 11,368,652 B1
(45) Date of Patent: Jun. 21, 2022

(54) VIDEO FRAME REPLACEMENT BASED ON AUXILIARY DATA

(71) Applicant: Amazon Technologies, Inc., Seattle, WA (US)

(72) Inventors: Gregory Johnson, Seattle, WA (US); Pragyana K. Mishra, Seattle, WA (US); Mohammed Khalilia, Seattle, WA (US); Wenbin Ouyang, Redmond, WA (US); Naveen Sudhakaran Nair, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/084,347

(22) Filed: Oct. 29, 2020

(51) Int. Cl.
*H04N 7/15* (2006.01)
*G10L 15/08* (2006.01)
*G06V 40/16* (2022.01)

(52) U.S. Cl.
CPC ............. *H04N 7/15* (2013.01); *G06V 40/168* (2022.01); *G10L 15/08* (2013.01)

(58) Field of Classification Search
CPC ............. H04N 7/15; H06K 9/00; G10L 15/28
USPC .......................................... 348/14.01–14.16
See application file for complete search history.

(56) References Cited

U.S. PATENT DOCUMENTS

| | | | | |
|---|---|---|---|---|
| 9,560,315 | B1* | 1/2017 | Silberman | H04N 7/152 |
| 10,904,488 | B1* | 1/2021 | Weisz | G06K 9/00362 |
| 2003/0023910 | A1 | 1/2003 | Myler | |
| 2006/0123445 | A1 | 6/2006 | Sullivan et al. | |
| 2007/0242066 | A1* | 10/2007 | Levy Rosenthal | H04N 7/15 345/419 |
| 2008/0231686 | A1* | 9/2008 | Redlich | H04N 7/15 348/14.08 |
| 2010/0295920 | A1* | 11/2010 | McGowan | H04N 21/4788 348/14.08 |
| 2016/0205428 | A1 | 7/2016 | McDonough et al. | |
| 2016/0301727 | A1* | 10/2016 | Barjonas | G06T 7/0002 |
| 2018/0089880 | A1* | 3/2018 | Garrido | H04N 21/44245 |

(Continued)

FOREIGN PATENT DOCUMENTS

WO    WO 2020/018458 A1    1/2020

OTHER PUBLICATIONS

U.S. Appl. No. 17/194,889, filed Mar. 8, 2021, Khalilia et al.

(Continued)

*Primary Examiner* — Melur Ramakrishnaiah
(74) *Attorney, Agent, or Firm* — BakerHostetler

(57) ABSTRACT

Audio content and played frames may be received. The audio content may correspond to first video content. The played frames may be included in the first video content. The first video content may further include a replaced frame. The played frames and the replaced frame may include a face of a person. Location data may also be received that indicates locations of facial features of the face of the person within the replaced frame. A replacement frame may be generated, such as by rendering the facial features in the replacement frame based at least in part on the locations indicated by the location data and positions indicated by a portion of the audio content that is associated with the replaced frame. Second video content may be played including the played frames and the replacement frame. The replacement frame may replace the replaced frame in the second video content.

20 Claims, 10 Drawing Sheets

(56) References Cited

U.S. PATENT DOCUMENTS

2020/0358983 A1* 11/2020 Astarabadi ......... G06K 9/00281
2021/0329338 A1 10/2021 Khov et al.

OTHER PUBLICATIONS

U.S. Appl. No. 17/194,653, filed Mar. 8, 2021, Johnson et al.

Wang et al.; "Image Inpainting via Generative Multi-column Convolutional Neural Networks"; Computer Vision and Pattern Recognition; Oct. 2018; 10 pages.

Prenger et al.; "WaveGlow: A Flow-based Generative Network for Speech Synthesis"; Artificial Intelligence, Machine Learning, Audio and Speech Processing, Machine Learning; Oct. 2018; 5 pages.

Ulyanov et al.; "Deep Image Prior"; Proceedings of the IEEE Conf. on Computer Vision and Pattern Recognition; May 2020; 23 pages.

Perraudin et al.; "Inpainting of long audio segments with similarity graphs"; Artificial Intelligence, Multimedia, Software Engineering; Feb. 2018; 13 pages.

Qu et al.; "LipSound: Neural Mel-spectrogram Reconstruction for Lip Reading"; Interspeech; Sep. 2019; p. 2768-2772.

"Facial Action Coding System", Wikipedia, https://en.wikipedia.org/wiki/Facial_Action_Coding_System, web-archive capture from. Aug. 7, 2020, accessed on Jul. 26, 2021 from https://web.archive.org/web/20200807130644/https://en.wikipedia.org/wiki/Facial_Action_Coding_System; 10 pages.

Nithiroj Tripatarasit; "Facial Keypoints Detection with PyTorch"; https://medium.com/diving-in-deep/facial-keypoints-detection-with-pytorch-86bac79141e4; May 2019; accessed Sep. 7, 2021; 29 pages.

Wang et al.; "Deep Learning for Image Super-resolution: A Survey"; IEEE Computer Vision and Pattern Recognition; Feb. 2020; 24 pages.

Liu et al.; "Video Super Resolution Based on Deep Learning: A Comprehensive Survey"; Computer Vision and Pattern Recognition; Jul. 2020; 24 pages.

Yang et al.; "Learning Texture Transformer Network for Image Super-Resolution"; Computer Vision and Pattern Recognition; Jun. 2020; 22 pages.

\* cited by examiner

VIDEO FRAME REPLACEMENT BASED ON AUXILIARY DATA

BACKGROUND

The popularity of videoconferencing has increased rapidly in recent years. Videoconferencing tools may allow multiple people at multiple different locations to interact by receiving both audio and video of one another. This may allow for more personal and detailed interactions between people participating in the videoconference, such as opposed to a mere telephone conference. For example, instead of merely hearing each other's voices, videoconferencing tools may allow participants to see each other's facial expressions and movements, thereby more closely simulating actual face-to-face interactions between people in the same room or other physical space. While videoconferencing provides many advantages, the transfer of video over bandwidth-constrained networks may also involve several challenges. For example, in certain conditions, existing network bandwidth may be insufficient to support all incoming video feeds, thereby resulting in quality degradation, lost frames, interrupted video feeds, and other problems. In some examples, these problems may occur when available bandwidth temporarily drops, when large numbers of participants join the video conference, or for other reasons.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
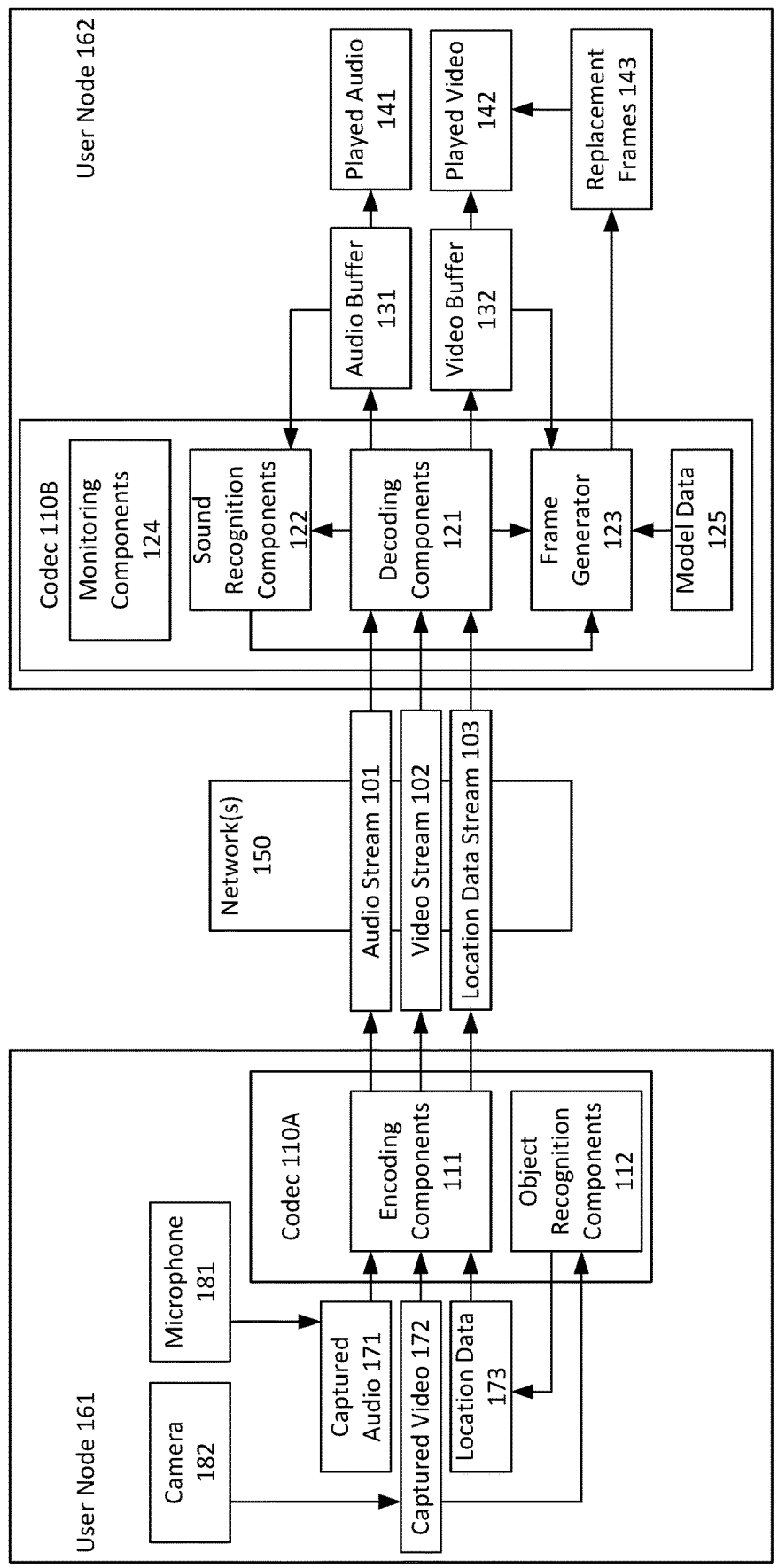
FIG. 1 is a diagram illustrating an example video frame replacement system that may be used in accordance with the present disclosure.

Techniques for video frame replacement based on auxiliary data are described herein. The techniques may be employed in a system in which video data and corresponding audio data are transmitted over a network, such as a videoconferencing system. The term videoconferencing, as used herein, refers to a conferencing system in which both audio and video of conference participants are transmitted over a network. In some examples, video of a person, such as depicting the person's face, may be captured by a camera and transmitted over a network to one or more receiving devices. The video may depict the person's head movements, lip movements, facial expressions, and the like. Additionally, corresponding audio may be captured by a microphone and transmitted over a network to the one or more receiving devices. The audio may include words and other sounds spoken by the person. In some examples, multiple users may participate in a videoconference, and each participant may receive audio and video from each other participant. Also, in some examples, the received video and audio data may be played live. This may allow conference participates to listen and respond to each other in real-time (or near-real-time), such as to more closely simulate a face-to-face conversation or meeting.

According to the techniques described herein, an object recognition analysis may be performed on the video of a person's face. In some examples, the object recognition analysis may be performed locally at the person's computer, for example by a codec used to encode the video for transmission to other users. The object recognition analysis may be employed to generate location data by tracking locations of facial features of the person's face in frames of the transmitted video data. In some examples, these facial features may include various designated points on the person's face, such as around the outer edges of the face, along the user's lips (e.g., points along upper lip, points along lower lip, points at intersections of lips, etc.), eyes, eyebrows, nose, ears, hairline, cheeks, chin, forehead, and other locations. In some examples, a respective data set of location data may be generated for each frame of the video content. Each data set of the location data may indicate locations of the facial features in the respective frame, such as two dimensional (e.g., X and Y) coordinate values for each facial feature in the respective frame. This location data may be transmitted along with the corresponding video data and audio data to one or more receiving devices.

In some examples, on a receiving device, a monitoring component may execute to determine one or more replaced frames of the transmitted video. The replaced frames are frames of the video content that are not played at the receiving device. In some examples, the replaced frames may include lost frames that are not received by receiving device (or are received out of order or too late) and frames that are received with poor quality, such as with high amounts of errors or missing or distorted data. In some examples, a temporary reduction in bandwidth may result in one or more lost frames and/or poor quality frames, which may be determined to be replaced frames. Additionally or alternatively, one or more lost and/or poor quality frames may be caused by scenarios in which one or more new participants join a videoconference, thereby resulting in additional video streams and higher amounts of transmitted and received data. In some examples, the monitoring component may determine replaced frames through various techniques, such as by estimating the incoming bandwidth, based on the amount of incoming data (e.g., quantity of conference participants, etc.), by checking the sequence of incoming video frames (e.g., to determine lost or missing frames), and/or by determining the quality of incoming video frames using one or more quality metrics.

The techniques described herein may allow the replaced frames to be replaced with replacement frames that are generated at the receiving device. Specifically, in some examples, a replacement frame may be generated based at least in part on the respective location data for the corresponding replaced frame. The locations of a person's facial features in the replacement frame may be determined based on the locations of the person's facial features in the replaced frame, and these locations may be specified in the location data. In particular, the location data may indicate locations of designated points on the person's face that were detected in the replaced frame, and the person's corresponding facial features may then be rendered at these locations in the replacement frame.

In addition or as an alternative to the location data described above, the techniques described herein may also allow a person's face, in the replacement frames, to be recreated based on the received audio data that corresponds to the video data. For example, a sound recognition analysis may be performed on the incoming audio data to determine one or words or other sounds spoken by the person whose face appears in the video. These sounds may then be used to estimate the positions of the person's lips and other facial features within the replacement frame. For example, a codec on the receiving device may have access to model data that indicates various lip positions corresponding to various different sounds, such as lip positions that are used to make the different sounds. The person's lips may then be rendered, in the replacement frame, with the determined lip positions, such as to lip synch sounds made by the person in the corresponding audio. Positions of other facial features may also be determined by the audio data. For example, sounds corresponding to an excited or surprised mood may result in in wide open eye positions, while sounds corresponding to an angry or sad mood may result in in narrow or squinting eye positions.

In some examples, in addition to audio data and/or location data, the replacement frame may also be generated based in part a most recently received high quality frame from the same video stream, such as may be obtained from an incoming video buffer. In some examples, this high quality frame may be employed to determine the person's facial characteristics, such as eye color, hair color, skin tone, and the like, which may assist in creating the replacement frame. In addition to these facial characteristics, the high quality frame may also assist determining other rendering characteristics, such as background color, lighting, shadows, and the like. In some examples, in addition or as an alternative to a most recently received high quality frame, the replacement frame may also be based in part on other high quality images of the person in the incoming video, such as a most recently received keyframe (e.g., instantaneous decoder refresh (IDR) frame), a high quality image sent at the start of the video stream, or a high quality image sent in a separate transmission or that has otherwise been acquired.

Thus, by generating the replacement frames based on auxiliary data, such as the location data and/or audio data described above, the techniques described herein may allow high quality video depictions of a person's face to be consistently displayed to users, even during periods of reduced bandwidth and while videoconferencing with large quantities of other participants. Some conventional techniques may attempt to adapt to low bandwidth conditions by reducing frame rate, resolution and/or video quality (e.g., compression). By contrast, by the replacement frame generation techniques described herein may allow video to be displayed without reductions to frame rate, resolution and/or video quality, and without interrupting the played video, thereby enhancing the user experience. Because the replacement frames may be generated and rendered locally at the receiving device, the replacement frames may be generated and displayed with high quality regardless of current bandwidth conditions.

FIG. 1 is a diagram illustrating an example video frame replacement system that may be used in accordance with the present disclosure. In the example of FIG. 1, frame replacement is performed using codecs 110A and 110B executing on user nodes 161 and 162, respectively. In some examples, codecs 110A and 110B may be separate codecs or may be considered to be components of a single codec. As shown in FIG. 1, user nodes 161 and 162 communicate over one or more network(s) 150. In some examples, user nodes 161 and 162 may each include a respective computing device, such as a desktop, laptop or tablet computer, smartphone, gaming console, set top box, and the like. As also shown in FIG. 1, captured video 172 is captured at user node 161 via a camera 182. The captured video 172 includes video of a person's face and head. The captured video 172 may include the person's head movements, lip movements, facial expressions, and the like. The captured video 172 is encoded by encoding components 111 and transmitted from user node 161 to user node 162 via video stream 102. As also shown in FIG. 1, captured audio 171 is captured at user node 161 via a microphone 181. The captured audio 171 includes audio data that corresponds to the captured video 172. The captured audio 171 may include words and other sounds spoken by the person that is displayed in the captured video 172. The captured audio 171 is encoded by encoding components 111 and transmitted from user node 161 to user node 162 via audio stream 101.

Thus, as described above, user node 162 receives captured audio 171 and captured video 172 from user node 161 via audio stream 101 and video stream 102, respectively. In some examples, a videoconference may be established between user node 161, user node 162 and optionally any number of other user nodes. In these examples, audio and video data may be exchanged between each user node that participates in the videoconference. For example, although not shown in FIG. 1, user node 162 may optionally receive audio data and video data of respective users from any number of other user nodes participating in the teleconference, while user node 161 may also receive audio and video data of respective users from user node 162 and other user nodes.

The audio stream 101 and video stream 102 are transmitted over one or more network(s) 150, which may include one or more local area networks (LAN's) and/or one or more wide area networks (WAN's), such as the Internet. The audio stream 101 and video stream 102 are transmitted using streaming transmission techniques, in which portions of transmitted content are received and played while subsequent portions of the transmitted content are being transmitted. In some examples, the audio stream 101 and video stream 102 may be transmitted using live streaming techniques, in which content of an event (e.g., a videoconference) may be transmitted to viewers, and at least part of the content may be played while the event is still occurring (e.g., while the videoconference is still occurring), albeit with some small amounts latency between the time that content is captured and the time that the content is eventually played to viewers. For example, for a videoconference, the received video and audio data may be played live. This may allow conference participates to listen and respond to each other in real-time (or near-real-time), such as to more closely simulate a face-to-face conversation or meeting.

As shown in FIG. 1, an object recognition analysis may be performed on the captured video 172 by object recognition components 112 at user node 161. The object recognition analysis may be employed to generate location data 173 by tracking locations of facial features of the person's face in frames of the captured video 172. In some examples, these facial features may include various designated points on the person's face, such as around the outer edges of the face, along the user's lips (e.g., points along upper lip, points along lower lip, points at intersections of lips, etc.), eyes, eyebrows, nose, ears, hairline, cheeks, chin, forehead, and other locations. The object recognition analysis may include analyzing an image, such as a frame, to detect shapes within the image that correspond to human features, such as circular, ovular, elliptical, linear or other shapes that correspond a face, eyes, mouth, nose, etc. For example, feature extraction techniques, such as a Hough transform, may be employed to detect, lines, circles, ellipses and other shapes. In some examples, a respective data set of location data 173 may be generated for each frame of the video content.

Each data set of location data 173 may indicate locations of the facial features in the respective frame, such as two dimensional (e.g., X and Y) coordinate values for each facial feature in the respective frame. For example, in some cases, the location data 173 may indicate locations of points on the face. In some examples, in addition or as an alternative to these points, the location data 173 may also include other location-related information, such as information regarding animation parameters, deformation parameters, action units, facial pose data, and other information associated with a shape or structure of the face and/or other objects in an image. This location data 173, including respective data sets for each frame of the captured video 172, may be encoded by encoding components 111 and transmitted to user node 162 over one or more network(s) 150 via location data stream 103. In some examples, the object recognition analysis may be synchronized with the captured video 172, such as by being repeatedly executed at a rate that is equivalent to the frame rate of the captured video 172, thereby allowing a respective data set of the location data 173 to be generated for each frame of the captured video 172

Figure 2:
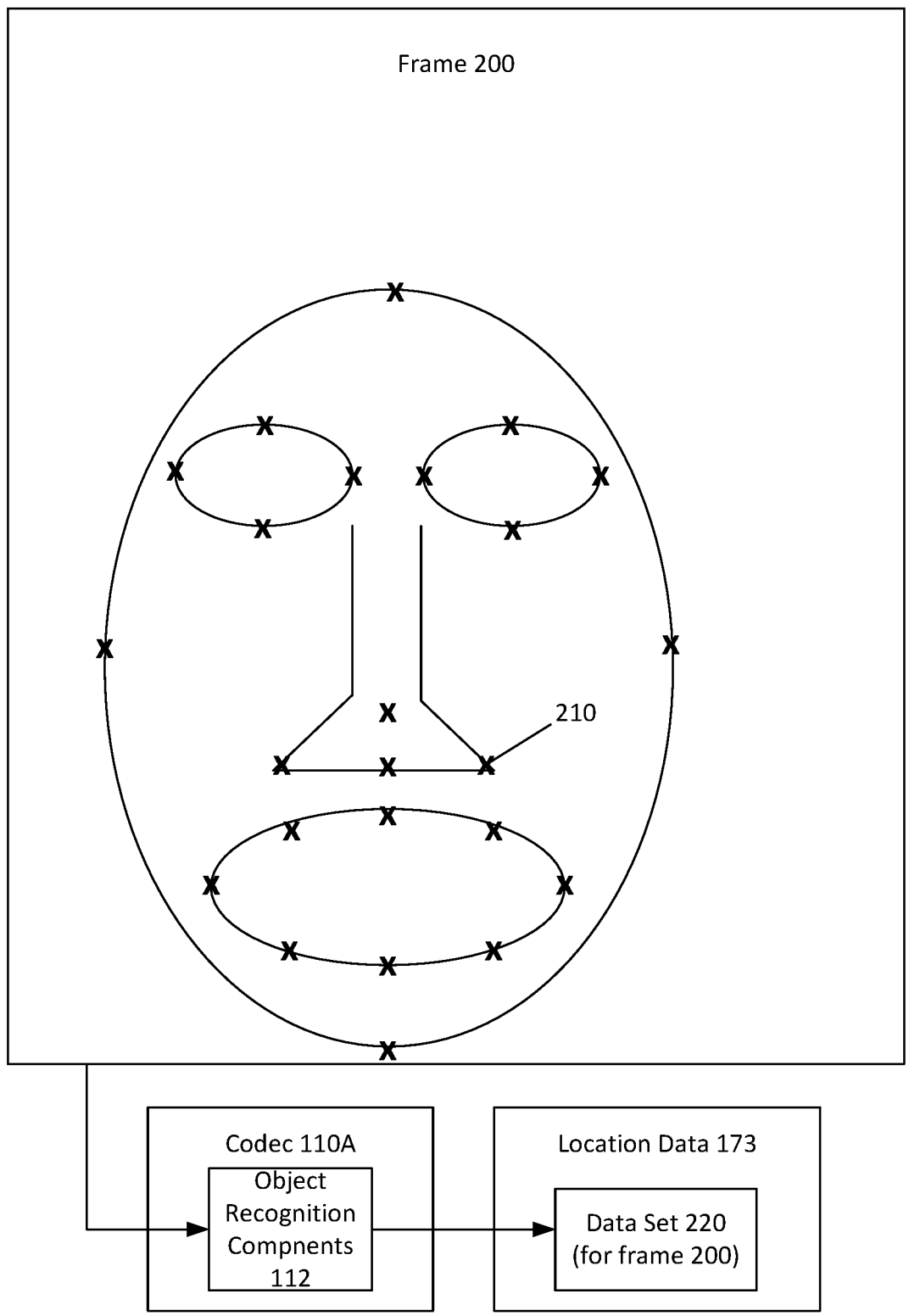
FIG. 2 is diagram illustrating first example location data for a first frame that may be used in accordance with the present disclosure.
Figure 3:
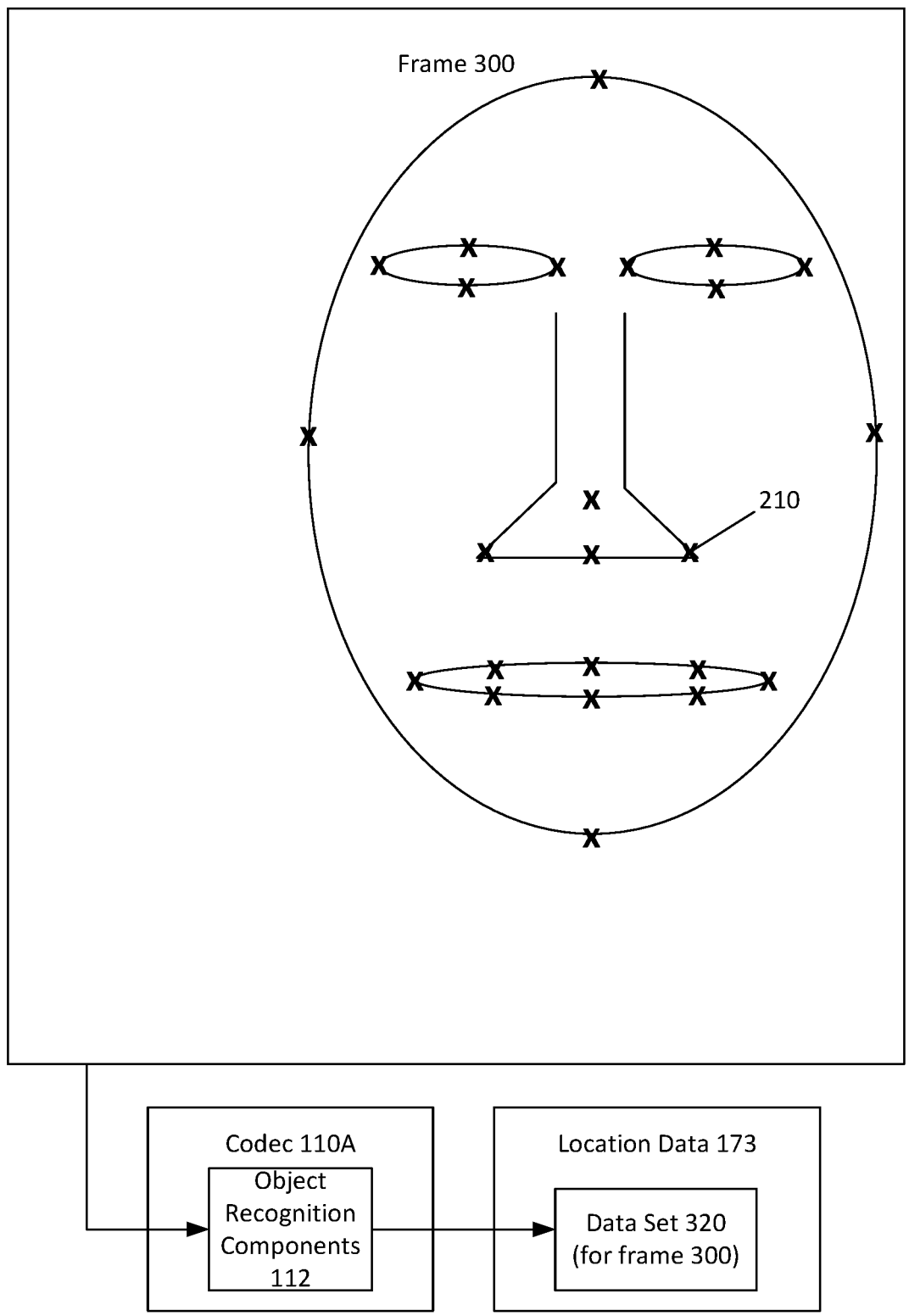
FIG. 3 is a diagram illustrating second example location data for a second frame that may be used in accordance with the present disclosure.

Referring now to FIGS. 2 and 3, some example data sets of location data 173 will now be described in detail. Specifically, as shown in FIG. 2, a frame 200, which is included in captured video 172, is provided to object recognition components 112. The object recognition components 112 perform an object recognition analysis on frame 200 to identify facial features 210 of a person's face that is shown in frame 200. Each of the facial features 210 is identified in FIG. 2 using an X symbol. In this example, the facial features 210 correspond to various points of the person's facial components (e.g., lips, nose, eyes and along outer edges of the person's face). The object recognition components 112 may then create a data set 220 corresponding to frame 200. The data set 220 may include locations of each of the facial features 210 within frame 200, such as such as two dimensional (e.g., X and Y) coordinate values for each facial feature 210.

Referring now to FIG. 3, facial features 210 are shown for a different frame (frame 300) of the captured video 172. As shown, the person's face in frame 300 of FIG. 3 differs in several ways from the same person's face in frame 200 of FIG. 2. Specifically, in frame 200, the person's mouth and eyes are wide open. By contrast, in frame 300, the person's mouth and eyes are more less wide open. Additionally, in frame 200, the person's face is shown close to the frame's bottom left corner. By contrast, in frame 300, the person's face has moved up and to the right, and the face is shown closer to the frame's top right corner. In FIG. 3, the object recognition components 112 perform an object recognition analysis on frame 300 to identify facial features 210 of a person's face that is shown in frame 300. The object recognition components 112 may then create a data set 320 corresponding to frame 300. The data set 320 may include locations of each of the facial features 210 within frame 300, such as such as two dimensional (e.g., X and Y) coordinate values for each facial feature 210.

Thus, as described above, data sets 220 and 320 may be included in location data 173 and a location data stream 103, which may be transmitted from user node 161 to user node 162 along with audio stream 101 and video stream 102. Referring back to FIG. 1, it is shown that audio stream 101, video stream 102, and location data stream 103 may be received by decoding components 121, which may decode the audio stream 101, video stream 102, and location data stream 103. After being decoded, portions of the audio stream 101 may be buffered at audio buffer 131 and then output as played audio 141, for example via one or more connected audio speakers. Similarly, after being decoded, frames of the video stream 102 may be buffered at video buffer 132 and then displayed as played video 142, for example by a video player via one or more connected display devices. However, as will be described in detail below, every frame that is originally included in the captured video 172 may not be played in the played video 142. Specifically, one or more frames of the captured video, such as frames that are lost and/or degraded in quality due to decreases in bandwidth, may be replaced with other frames that are generated locally at user node 162 based on auxiliary data, such as location data 173 and/or captured audio 171.

In the example of FIG. 1, monitoring component 124 executes on user node 162 to determine one or more replaced frames of the captured video 172. The replaced frames are frames of the captured video 172 that are not played at the user node 162. In some examples, the replaced frames may include lost frames that are not received by user node 162 (or are received out of order or too late) and frames that are received with poor quality, such as with high amounts of errors or missing or distorted data. In some examples, a temporary reduction in bandwidth may result in one or more lost frames and/or poor quality frames, which may be determined to be replaced frames. Additionally or alternatively, one or more lost and/or poor quality frames may be caused by scenarios in which one or more new participants join a videoconference, thereby resulting in additional video streams and higher amounts of transmitted and received data. In some examples, the monitoring component 124 may determine replaced frames through various techniques, such as by estimating the incoming bandwidth, based on the amount of incoming data (e.g., quantity of conference participants, etc.), by checking the sequence of incoming video frames (e.g., to determine lost or missing frames), and/or by determining the quality of incoming video frames using one or more quality metrics. For example, the monitoring component 124 may monitor incoming fames to detect when a frame has more than a threshold amount of errors or has below a threshold resolution level or a threshold compression level. In some examples, if one or more of these conditions are met, then the frame may be considered to have poor quality and may be determined to be a replaced frame. In some examples, when the monitoring component 124 determines that bandwidth has dropped, the monitoring component 124 may instruct user node 162 to temporarily stop requesting video content from user node 161 and/or may instruct user node 161 to temporarily stop sending video content to user node 162. This may help to preserve available bandwidth for other data, such as other content being received by other participants in a videoconference.

As shown in FIG. 1, the user node 162 includes a frame generator 123, which generates replacements frames 143 that replace the replaced frames within played video 142. In one specific example, monitoring components 124 may identify a frame number for each frame that is determined to be a replaced frame. The monitoring components 124 may then send the frame numbers of the replaced frames to frame generator 123, which may generate a respective replacement frame for each identified frame number of the replaced frames.

Figure 4:
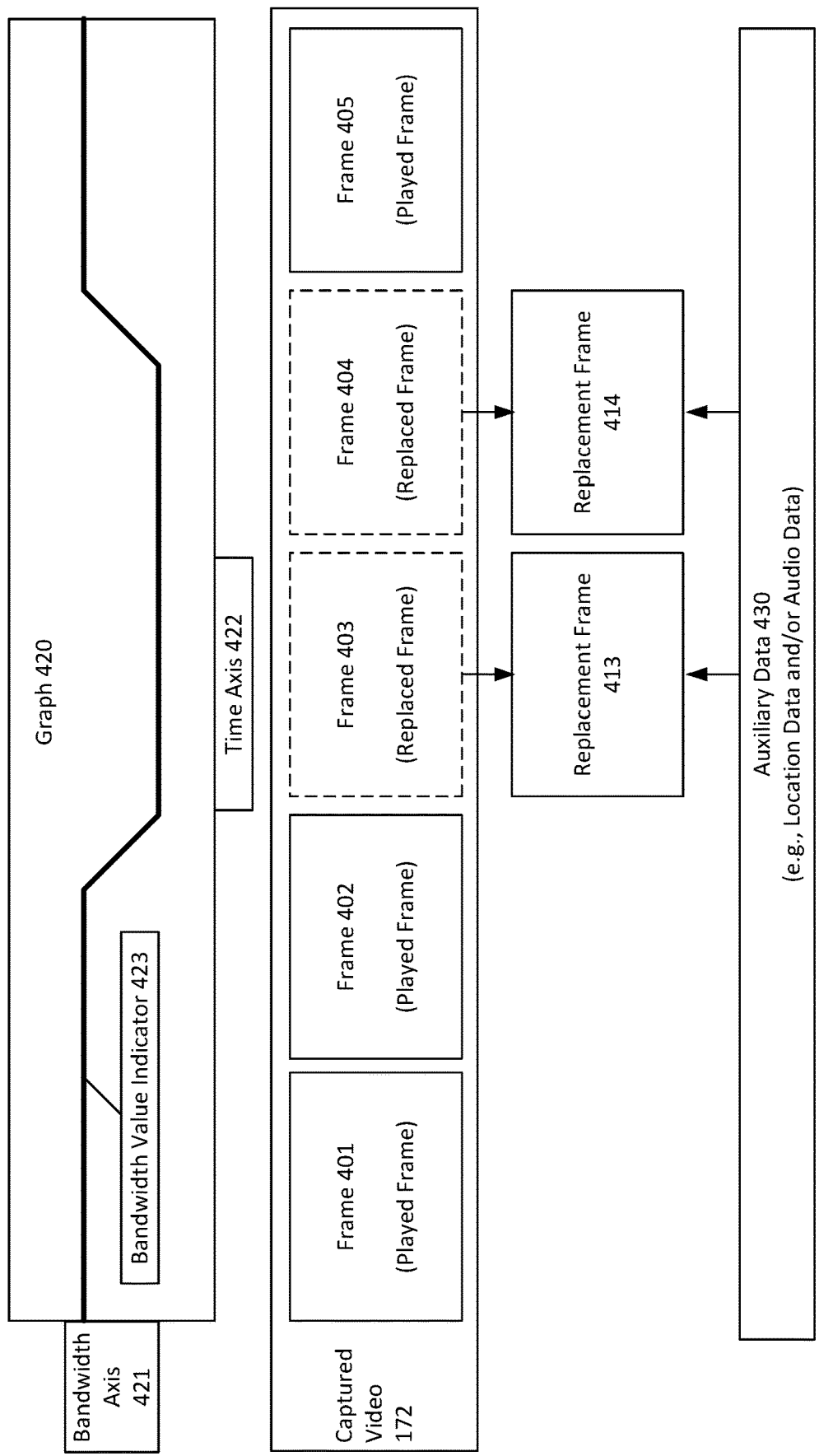
FIG. 4 is a diagram illustrating example replaced frames and replacement frames that may be used in accordance with the present disclosure.

Referring now to FIG. 4, an example is provided in which a graph 420 shows changes in bandwidth during transmission of captured video 172 from user node 161 to user node 162. The captured video 172 includes frames 401-405. The graph 420 includes bandwidth axis 421, which is a vertical axis that reflects bandwidth values that increase from bottom to top. The graph also includes time axis 422, which is a horizontal axis that reflects the time expired, increasing from left to right, during transmission of the captured video 172. The bandwidth value indicator 423 tracks changes in the bandwidth over time during transmission of the captured video 172. Additionally, in this example, the horizontal positions of frames 401-405 in FIG. 4 correlate to the time axis 422 of graph 420. For example, at the times that frames 401 and 402 are received by user node 162, the available bandwidth is high, as indicated by the bandwidth value indicator 423 having a raised vertical position on the left side of graph 420. In some examples, based on this high available bandwidth, monitoring component 124 may determine that frames 401 and 402 are played frames that will be displayed in the played video 142. However, towards the end of frame 402, the available bandwidth begins to decrease, as indicated by the downward slope of bandwidth value indicator 423 in graph 420. As shown, frames 403 and 404 coincide with a decreased bandwidth, as indicated by the lowered vertical position of bandwidth value indicator 423 in the middle portion of graph 420. As a result, frames 403 and 404 may not be received by user node 162 or may be received with poor quality. In this case, due to this decreased bandwidth, the monitoring component 124 may determine that frames 403 and 404 are replaced frames. Accordingly, because frames 403 and 404 are replaced frames, frame generator 123 may generate replacement frames 413 and 414 to replace frames 403 and 404, respectively, in the played video 142. As also shown in FIG. 4, towards the end of frame 404, the available bandwidth begins to increase, as indicated by the upward slope of bandwidth value indicator 423 in graph 420. As shown, frame 405 coincides with an increased bandwidth, as indicated by the raised vertical position of bandwidth value indicator 423 in the right portion of graph 420. In some examples, based on this increase in available bandwidth, monitoring component 124 may determine that frame 405 is a played frame that will be displayed in the played video 142. As will be described in detail below, replacement frames 413 and 414 may be generated based at least in part on auxiliary data 430, such as location data 173 and/or captured audio 171. In some examples, the frame generator 123 may employ a graphics processing unit (GPU) at user node 162 to assist in generating the replacement frames 413 and 414 based on rendering instructions created by the frame generator 123.

Figure 5:
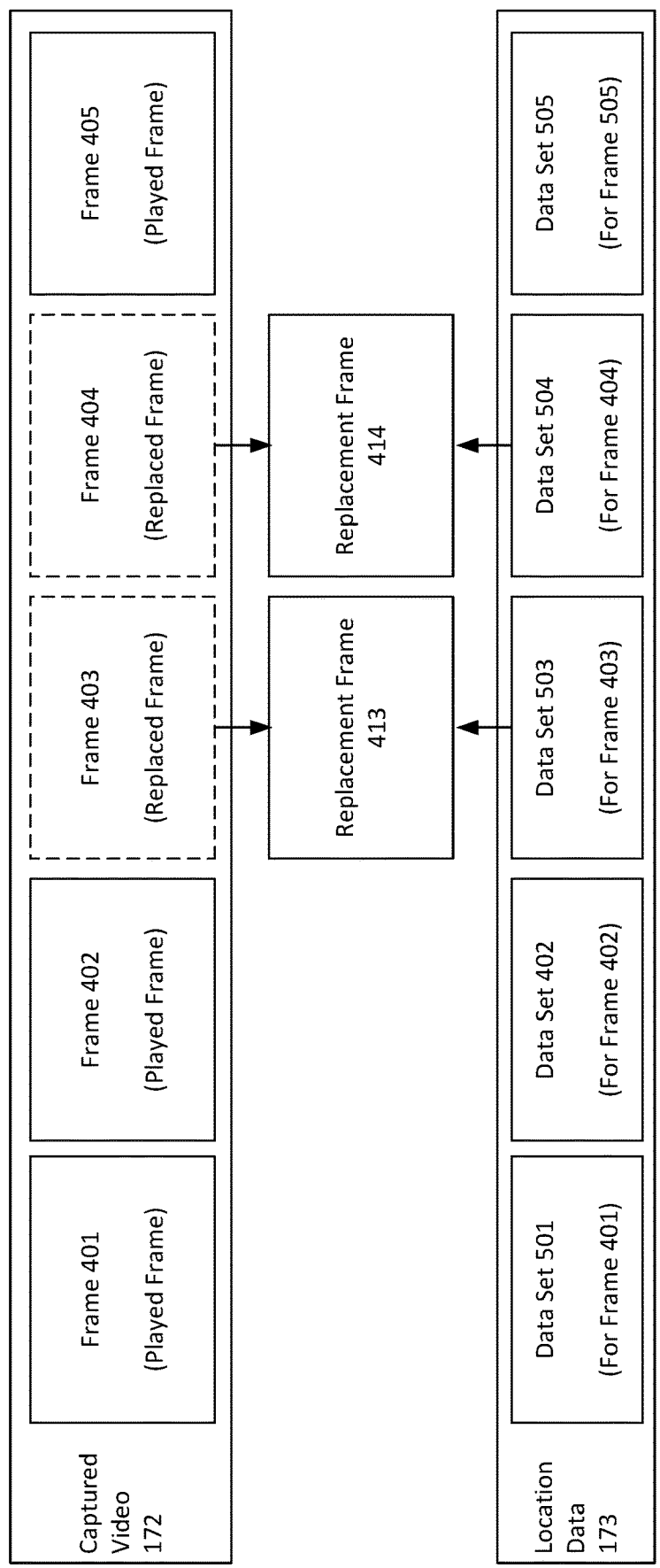
FIG. 5 is a diagram illustrating example frame replacement based on location data that may be used in accordance with the present disclosure.

In some examples, frame generator 123 may generate replacement frames 413 and 414 based at least in part on respective data sets of location data 173 for the corresponding replaced frames (frames 403 and 404). Referring now to FIG. 5, an example is shown in which location data 173 includes data sets 501-505, corresponding to frames 401-405, respectively. As described above, each data set 501-505 may identify locations of facial features, such as facial features 210 of FIGS. 2 and 3, in the respective frames 401-405, such as by identifying two dimensional (e.g., X and Y) coordinate values for each facial feature in the respective frames 401-405. In the example of FIG. 5, replacement frame 413 is generated based at least in part on data set 503, which corresponds to frame 403 and identifies locations of facial features in frame 403. The locations of a person's facial features in the replacement frame 413 may be determined based on the locations of the person's facial features in the corresponding replaced frame (frame 403), and these locations may be specified in the data set 503. In particular, the data set 503 may indicate locations of designated points on the person's face that were detected in frame 403, and the person's corresponding facial features may then be rendered at these locations in the replacement frame 413. Similarly, in the example of FIG. 5, replacement frame 414 is generated based at least in part on data set 504, which corresponds to frame 404 and identifies locations of facial features in frame 404.

In addition or as an alternative to location data 173, the techniques described herein may also allow a person's face, in the replacement frames, to be rendered based on the captured audio 171 that corresponds to the captured video 172. For example, referring back to FIG. 1, sound recognition components 122 may perform a sound recognition analysis on the captured audio 171 from audio stream 101. The sound recognition analysis may be performed to determine one or words or other sounds spoken by the person whose face appears in the captured video 172. These sounds may then be used to estimate the positions of the person's lips and other facial features within the replacement frames 143. In some examples, the sound recognition analysis may include determining audio characteristics, such as amplitudes at various frequencies, pitch, tone, stress, and the like. In some cases, to assist in performing this analysis, audio data may be transformed to the frequency domain. The sound recognition analysis may also include speech recognition to identify one or more words spoken by the person.

In some examples, the results of the sound recognition analysis may be provided to frame generator 123, which may use the results to generate replacement frames 143. For example, frame generator 123 may have access to model data 125 that indicates various lip positions corresponding to various different sounds, such as lip positions that are used to make the different sounds. In some examples, model data 125 may be based on a learned model, such as may be determined by artificial neural networks and machine learning techniques. For example, in some cases, clips of video and corresponding audio may be provided as input to machine learning algorithms, which may over time analyze the input to correlate various lip movements and lip positions shown in the video clips with corresponding sounds in the audio clips. In some examples, the frame generate 123 may, based on model data 125, use the results of the sound recognition analysis to render a person's lips in the replacement frames with the determined lip positions, such as to lip synch sounds made by the person in the captured audio 171. Positions of other facial features may also be determined based on the captured audio 171. For example, sounds corresponding to an excited or surprised mood may result in in wide open eye positions, while sounds corresponding to an angry or sad mood may result in in narrow or squinting eye positions.

Figure 6:
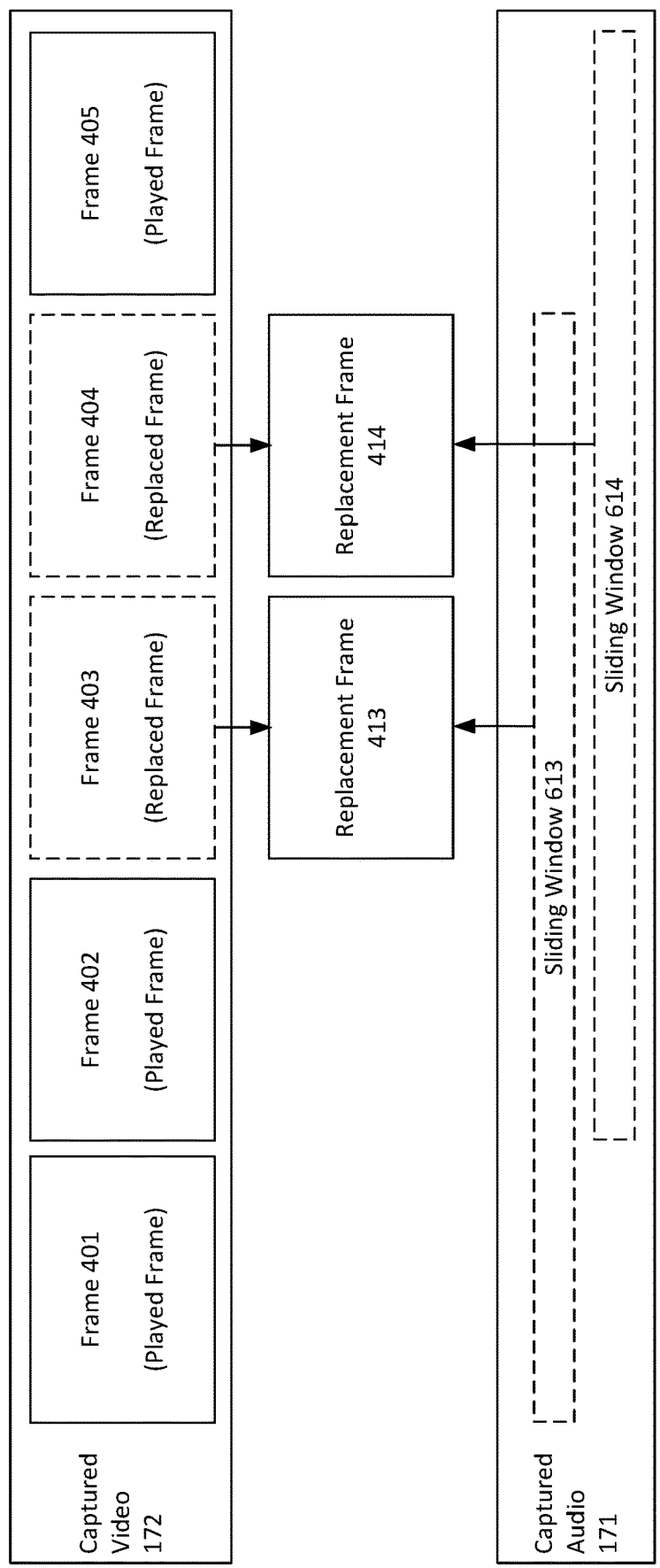
FIG. 6 is a diagram illustrating example frame replacement based on audio content that may be used in accordance with the present disclosure.

Referring now to FIG. 6, an example is shown in which replacement frames 413 and 414 are generated based at least in part on captured audio 171. Specifically, in the example of FIG. 6, each replacement frame 413 and 414 is generated based on a sliding window 613 and 614, respectively. For example, sliding window 613 is a portion of the captured audio 171 that is associated with the replacement frame 413. In this example, the sliding window 613 includes parts of captured audio 171 that directly coincide with the corresponding replaced frame (frame 403) as well as some of the immediately preceding frames (frames 401 and 402) and the immediately following frame (frame 404). Sliding window 614 similarly corresponds to replacement frame 414. The use of sliding windows 613 and 614 may allow a longer time period (i.e., longer than merely a single frame) to be considered to allow for interpretation of lip movements that may form words or other sounds and that may not be easily determined from looking at only sounds coinciding with a single frame. In other examples, however, the sliding windows could be limited to only a portion of audio content that directly coincides with the corresponding replaced frame.

In some examples, in addition to the captured audio 171 and/or location data 173, a replacement frame may also be generated based in part on one or more of the most recently received high quality frames from the same video stream, such as may be obtained from video buffer 132. For example, in FIGS. 4-6, the replacement frames 413 and 414 may be generated based on frame 402, which may be the most recently received high quality frame prior to the corresponding replaced frames (frames 403 and 404) in the captured video 172. In some examples, this high quality frame may be employed to determine the person's facial characteristics, such as eye color, hair color, skin tone, and the like, which may assist in creating the replacement frame. In addition to these facial characteristics, the high quality frame may also assist determining other rendering characteristics, such as background color, lighting, shadows, and the like. In some examples, in addition or as an alternative to a most recently received high quality frame, the replacement frame may also be based in part on other high quality images of the person in the incoming video, such as one or more of the most recently received keyframes (e.g., instantaneous decoder refresh (IDR) frames), a high quality image sent at the start of the video stream, or a high quality image sent in a separate transmission or that has otherwise been acquired.

Figure 7:
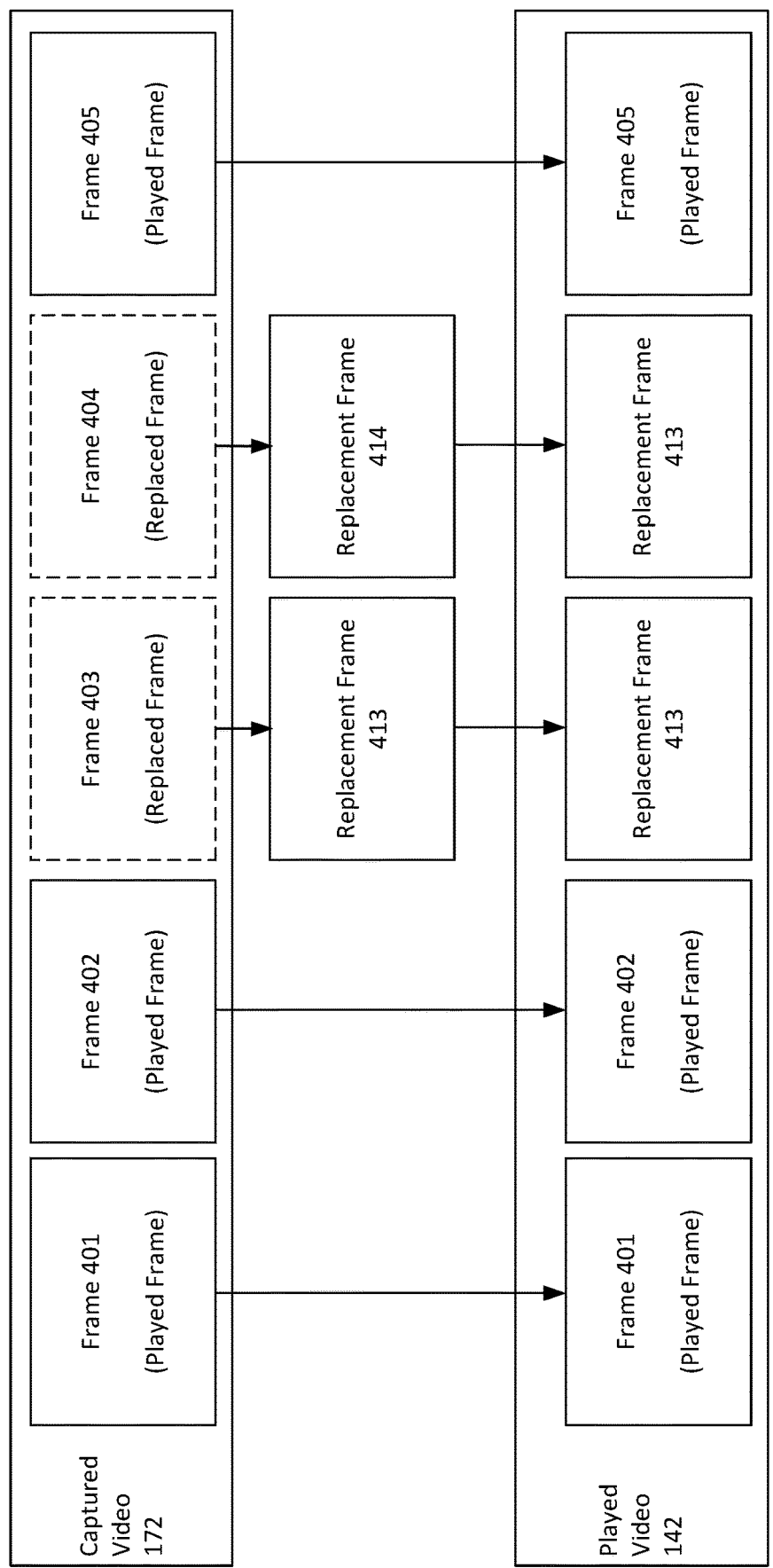
FIG. 7 is a flowchart illustrating example played video content with replacement frames that may be used in accordance with the present disclosure.

Referring now to FIG. 7, it is shown that the played video 142, which is video content that is displayed to user at the user node 162, may include the played frames from the captured video 172 (which includes played frames 401, 402 and 405) as well as the replacement frames 413 and 414. In this manner, the replacement frames 413 and 414 replace the corresponding replaced frames (frames 403 and 404) in the played video 142. Thus, by generating the replacement frames 413 and 414 based on auxiliary data, such as the location data 173 and/or captured audio 171, the techniques described herein may allow high quality video depictions of a person's face to be consistently displayed to users, even during periods of reduced bandwidth and while videoconferencing with large quantities of other participants.

In some examples, data from a given frame, as well as auxiliary data (e.g., audio data and/or location data) corresponding to a given frame, may be used to make a prediction regarding the contents of future frames. For example, the auxiliary data may be used to make a prediction about a person's head movement and positions and orientations of facial features (e.g., lips, eyes, nose, etc.) in future frames. In one example, a portion of audio content (or other data) associated with a replaced image frame may be used to predict contents of a future image frame that is subsequent to the replaced image frame. If the future frame is not received (or is received with poor quality), then the prediction of the contents of the future frame may then be used to assist in generating a replacement frame to replace the future frame. By contrast, if a high quality version of the future frame is successfully received, then the predicted contents of the future frame may be compared to the actual contents of the future frame, such as to assist in improving the accuracy of subsequent predictions.

Figure 8:
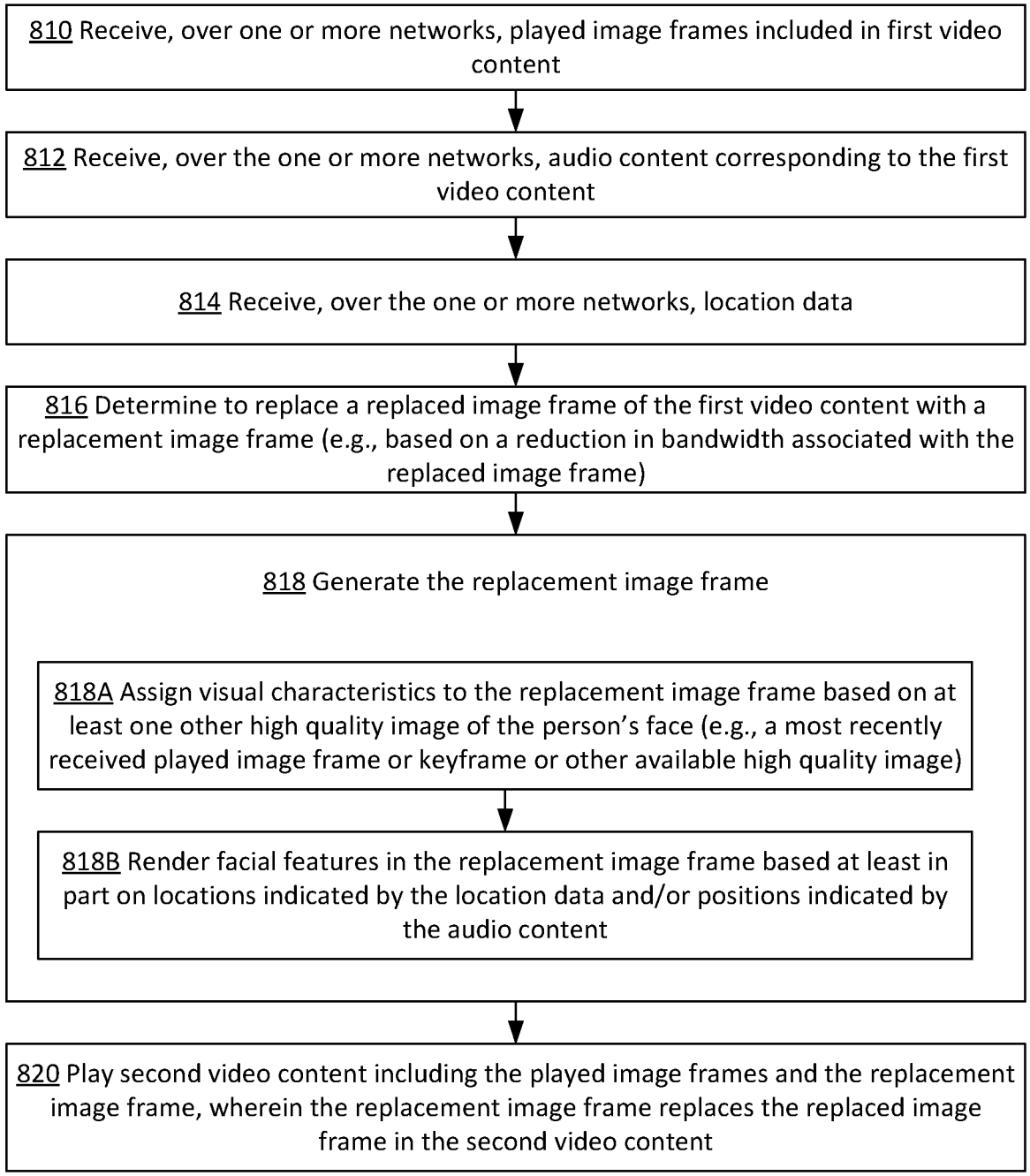
FIG. 8 is a flowchart illustrating an example video frame replacement process that may be used in accordance with the present disclosure.

FIG. 8 is a flowchart illustrating an example video frame replacement process that may be used in accordance with the present disclosure. The process of FIG. 8 is initiated at operation 810, at which played image frames included in first video content (e.g., captured video 172 of FIG. 1) are received over one or more networks. For example, user node 162 of FIG. 1 may receive frames 401, 402 and 405 of FIGS. 4-7 over one or more networks. As shown in FIGS. 4-7, frames 401, 402 and 405 are played frames that are included in captured video 172. The first video content may further include a replaced image frame (and potentially multiple replaced image frames). For example, as shown in FIGS. 4-7, the captured video 172 further includes frames 403 and 404, which are replaced image frames. In some examples, the replaced image frames may not be received by user node 162 or may be received with poor image quality, for example due to a reduction in network bandwidth associated with the replaced image frames. As described above, the played image frames and the replaced image frame may include a face of a person. As also described above, in some examples, the first video content may be generated as part of a videoconferencing session.

At operation 812, audio content (e.g., captured audio 171 of FIG. 1) including audio corresponding to the first video content is received over the one or more networks. For example, as shown in FIG. 1, user node 162 may receive captured audio 171 over one or more network(s) 150 via audio stream 101. The audio content may include sounds spoken by the person whose face is included in the played frames and the replaced frames of the first video content. At operation 814, location data is received over the one or more networks. For example, as shown in FIG. 1, user node 162 may receive location data 173 over one or more network(s) 150 via location data stream 103. The location data may indicate locations of facial features of the face of the person within the replaced image frame. For example, as shown in FIG. 5, the location data 173 includes a data set 503, which indicates locations of facial features of a face of the person within a corresponding replaced frame (frame 403). As described above, an object recognition analysis may be performed on the replaced image frame (frame 403) to determine the locations of the facial features.

At operation 816, a determination is made to replace a replaced image frame of the first video content with a replacement image frame. In some examples, this determination may be made based at least in part on a reduction in bandwidth associated with the replaced image frame. For example, as shown in FIG. 4, a reduction in bandwidth occurs just before transmission of frame 403, as indicated by graph 420. This reduction in bandwidth may result in a determination to replace frame 403 with replacement frame 413. As described above, in some examples, the reduction in bandwidth may cause the replaced frame to not be received or to be received with poor quality (e.g., high amounts of errors, low resolution, low compression, etc.). In some examples, a monitoring component may estimate the available bandwidth and determine to replace one or more frames that are transmitted and/or received during times when the bandwidth is reduced. In some cases, the monitoring component may monitor incoming frame numbers of incoming frames to determine when frames are not received. Additionally, in some examples, the monitoring component may determine the quality of incoming video frames using one or more quality metrics. For example, the monitoring component may monitor incoming fames to detect when a frame has more than a threshold amount of errors or has below a threshold resolution level or a threshold compression level. In some examples, if one or more of these conditions are met, then the frame may be considered to have poor quality and may be determined to be a replaced frame.

At operation 818, the replacement image frame is generated. In some examples, the generating of the replacement image frame may be performed at least in part by a codec, such as codec 110B of FIG. 1. Also, in some examples, generating of the replacement image frame may include performing sub-operations 818A and 818B. At sub-operation 818A, visual characteristics are assigned to the replacement image frame based on at least one other high quality image of the person's face, such as a most recently received one of the played image frames that precedes the replaced image frame in the first video content and/or a most recently received keyframe. In some examples, this high quality frame may be employed to determine visual characteristics including the person's facial characteristics, such as eye color, hair color, skin tone, and the like, which may assist in creating the replacement frame. In addition to these facial characteristics, the high quality frame may also assist determining other visual characteristics, such as background color, lighting, shadows, and the like. These determined visual characteristics may be assigned to the replacement image frame, and the replacement image frame may be rendered to display these visual characteristics. In some examples, in addition or as an alternative to a most recently received played frame, the replacement frame may also be based in part on other high quality images of the person in the incoming video, such as a most recently received keyframe (e.g., instantaneous decoder refresh (IDR) frame), a high quality image sent at the start of the video stream, or a high quality image sent in a separate transmission or that has otherwise been acquired.

At sub-operation 818B, facial features in the replacement image frame are rendered based at least in part on the locations indicated by the location data and/or positions indicated by the audio content, such as positions of a portion of the audio content that is associated with the replaced image frame. For example, as described above, the facial features in the replacement image frame may be rendered at the locations indicated by the location data, thereby matching the locations of the facial features in the replacement frame to the locations of the facial features in the replaced frame. Additionally, in some examples, a sound recognition analysis may be performed on a portion of the audio content associated with the replaced frame (e.g., sliding window 613 of FIG. 6) to determine one or more sounds spoken by the person. The frame generator may then determine positions indicated by the portion of the audio content, which may include lip positions associated with the one or more sounds. The facial features may then be rendered at the positions indicated by the portion of the audio content, such as the lip positions associated with the one or more sounds. As also described above, output from a machine learning model may indicate a correlation between the sounds spoken by the person and the lip positions associated with the one or more sounds.

In some examples, operation 818B may include morphing a prior high quality frame, such as to synthesize the prior high quality frame with the locations and positions of facial features that are determined for the replacement frame based at least in part on the location data and/or audio data. In one specific example, the prior high quality frame may be used as an initial template for the replacement image that may indicate default locations, positions, orientations, and other features (e.g., lighting, shadows, colors, textures, etc.) for objects in the replacement frame. These initial default parameters may then be modified based on the auxiliary data (e.g., location data and/or audio data) associated with the replacement frame. For example, if the auxiliary data indicates that the person's face has a different location in the replacement frame than in the prior frame, then the location of the person's face may be adjusted from its default location to the new location indicated by the auxiliary data. As another example, if the auxiliary data indicates that that the person's lips have different positions and orientations in the replacement frame than in the prior frame, then the positions and orientations of the person's lips may be adjusted from their default positions and orientations to the new positions and orientations indicated by the auxiliary data.

In some examples, in addition or as an alternative to prior high quality frames, data from a replaced frame itself may also be used to generate a corresponding replacement frame. For example, facial features may be rendered in the replacement image frame based at least in part on the information obtained from the replaced image frame. In some cases, when the bandwidth drops, all, or part, of a replaced frame may be received by the receiving node, albeit, in some cases, with high amounts or errors, distortion or missing or incomplete data. Although the receiving node may choose to replace this frame with a locally generated replacement frame, the receiving node may still use at least some of the received data from the replaced frame to assist in creating the replacement frame. For example, in some cases, the replaced frame may include information regarding a person's head pose, locations and positions of facial features (e.g., lips, eyes, nose, etc.), lighting, shadows, colors, textures, and the like. In some examples, a prior high quality frame could be used as a template image for the replacement frame (as described above), and this template image could be morphed, such as to synthesize the prior high quality frame with the locations and positions of facial features that are determined based at least in part on data from the replaced frame. For example, if the replaced frame indicates that the person's face has a different location than in the prior frame, then the location of the person's face may be adjusted from its default location to the new location indicated by the replaced frame. As another example, if the replaced frame indicates that that the person's lips have different positions and orientations than in the prior frame, then the positions and orientations of the person's lips may be adjusted from their default positions and orientations to the new positions and orientations indicated by the replaced frame.

At operation 820, the second video content (e.g., played video 142 of FIG. 7) is played. The played video content includes the played image frames and the replacement image frame. The replacement image frame replaces the replaced image frame in the second video content. For example, as shown in FIG. 7, played video 142 includes frames 401, 402 and 405, which are the played image frames, as well as replacement frames 413 and 414. The replacement frames 413 and 414 replaced the corresponding replaced frames (frames 403 and 404) in the played video 142.

It is noted that, in some of the above described examples, the location data may be computed on the transmitting device/node that captures the image data. For example, as shown in FIG. 1, location data 173 may be computed by object recognition components 112 on user node 161. It is noted, however, that there is no requirement that location data must be computed on the same transmitting device/node that captures the image data. For example, in some cases, captured video 172 may be streamed from the user node 161 to a cloud service (or other service or node). The cloud service could then execute an object recognition process to compute the location data 173. The location data 173 could then be transmitted from the cloud service to the user node 162 and employed by the user node 162 to generate the replacement frames 143. In some examples, this strategy may sometimes be employed when the transmitting node (e.g., user node 161) has a high bandwidth connection and the receiving node (e.g., user node 162) has a low bandwidth connection. In some cases, this technique could be further advantageous, such as by potentially reducing an amount of processing and calculations that are performed at the transmitting node.

Additionally, in some of the above described examples, the replacement frames are generated on the receiving device/node. For example, as shown in FIG. 1, replacement frames 143 may be generated by frame generator 123 on user node 162. It is noted, however, that there is no requirement that replacement frames must be generated on the receiving device/node. For example, in some cases, location data 173 (and optionally captured video 172) may be streamed from the user node 161 to a cloud service (or other service or node). The cloud service could then generate the replacement frames 143 using the techniques described above. The cloud service could then send the replacement frames 143 to the user node 162 to be played at the user node 162. In some examples, this strategy could be employed when the transmitting node (e.g., user node 161) has a low bandwidth connection and the receiving node (e.g., user node 162) has a high bandwidth connection. In some cases, this technique could be further advantageous, such as by potentially reducing an amount of processing and calculations that are performed at the receiving node.

It is noted that, while some of the example techniques described above relate to videoconferencing, the techniques described above may also be employed in other contexts. For example, in some cases, one or more dropped frames of a sports broadcast could be rendered based on transmitted audio content corresponding to the sports broadcast, such as a commentator's play-by-play descriptions of the sports broadcast. These descriptions may include details about movements and positions of the athletes and sports equipment (e.g., bats, balls, etc.). In other examples, one or more missing frames of a movie of other video item could be rendered based on corresponding audio from the video content, such as actor's and/or character's voices that provide details about events that occur in the missing frames. In yet other examples, an interpolation may be made between location data sets for adjacent frames. This may allow additional new frames to be created and inserted between the two formerly adjacent frames. This interpolation process could be employed to create a higher frame rate video from an original video with a lower frame rate. The interpolation process could also be employed to create a slow motion effect such as by playing the new video with the extra interpolated frames at the same (or lower) frame rate as the original video.

Figure 9:
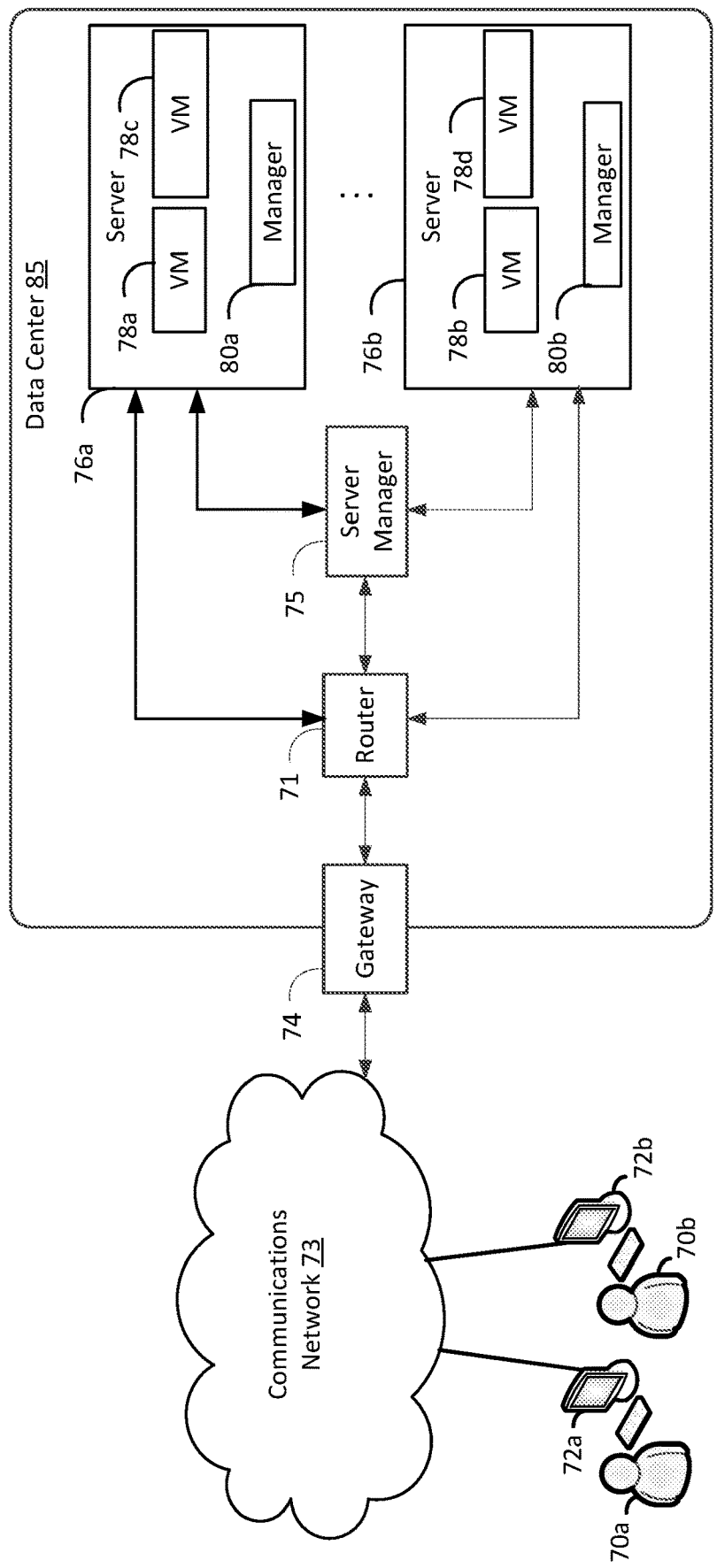
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76*a* and 76*b*. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
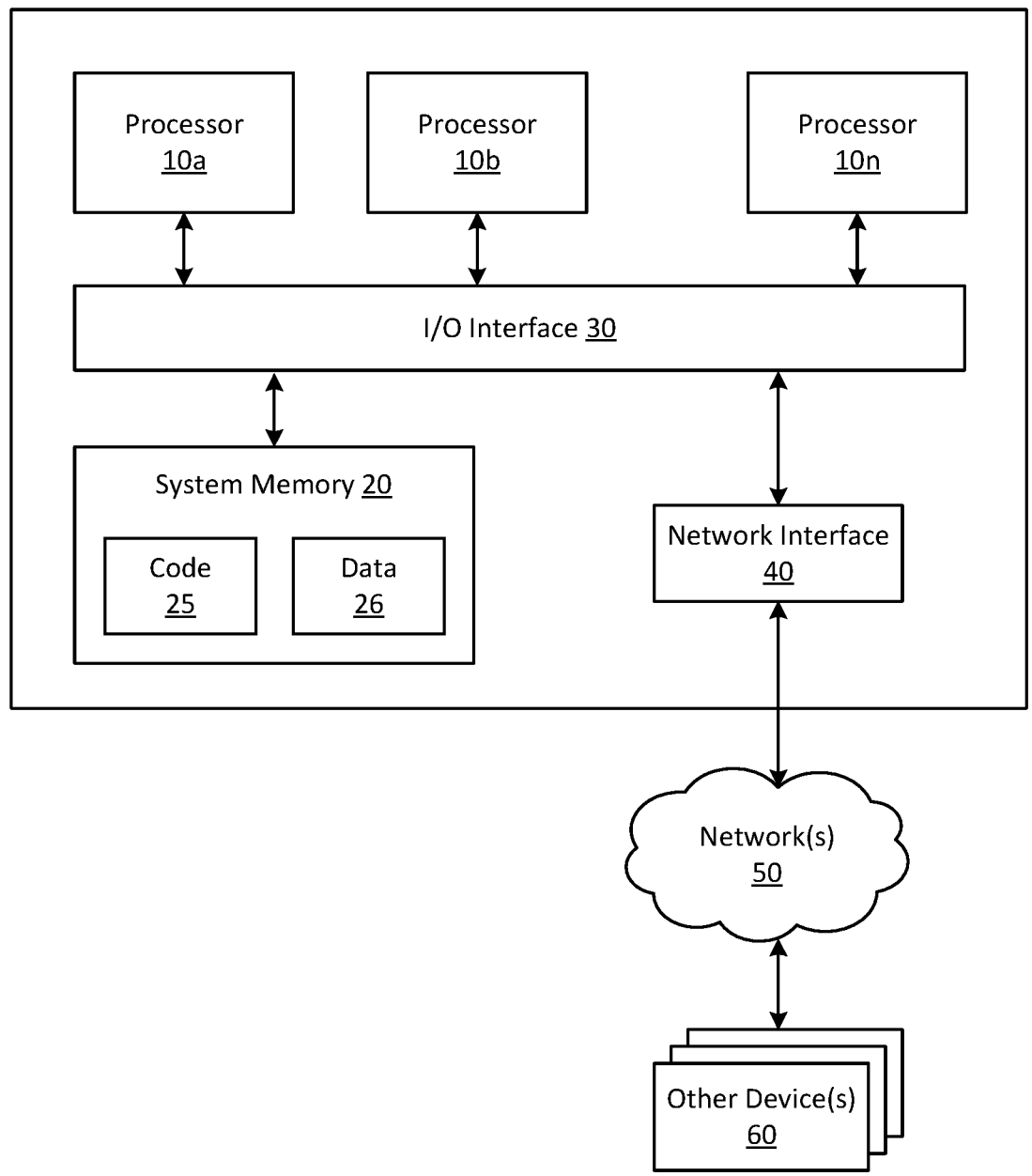
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/ cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving, over one or more networks, audio content and played image frames, wherein the audio content corresponds to first video content, wherein the played image frames are included in the first video content, wherein the first video content further includes a replaced image frame, wherein the played image frames and the replaced image frame include a face of a person;
receiving, over the one or more networks, location data that indicates locations of facial features of the face of the person within the replaced image frame, wherein location tracking of facial features in the first video content is performed based on an object recognition analysis;
generating a replacement image frame, wherein the generating of the replacement image frame comprises rendering the facial features in the replacement image frame based at least in part on the locations indicated by the location data that is generated for the replaced frame based on the object recognition analysis and positions indicated by a portion of the audio content that is associated with the replaced image frame; and
playing second video content including the played image frames and the replacement image frame, wherein the replacement image frame replaces the replaced image frame in the second video content.

2. The computing system of claim 1, wherein the operations further comprise determining, based at least in part on a reduction in bandwidth, to replace the replaced image frame in the second video content.

3. The computing system of claim 1, wherein the operations further comprise performing a sound recognition analysis on the portion of the audio content to determine one or more sounds spoken by the person, wherein the positions indicated by the portion of the audio content comprise lip positions associated with the one or more sounds.

4. The computing system of claim 1, wherein the facial features comprise points on the face of the person.

5. A computer-implemented method comprising:
receiving, over one or more networks, played image frames included in first video content, wherein the first video content further includes a replaced image frame, and wherein the played image frames and the replaced image frame include a face of a person;
receiving, over the one or more networks, location data that indicates locations of facial features of the face of the person within the replaced image frame, wherein location tracking of facial features in the first video content is performed based on an object recognition analysis;
generating a replacement image frame, wherein the generating of the replacement image frame comprises rendering the facial features in the replacement image frame based at least in part on the locations indicated by the location data that is generated for the replaced frame based on the object recognition analysis; and
playing second video content including the played image frames and the replacement image frame, wherein the replacement image frame replaces the replaced image frame in the second video content.

6. The computer-implemented method of claim 5, further comprising receiving, over the one or more networks, audio content including audio corresponding to the first video content.

7. The computer-implemented method of claim 6, wherein the rendering of the facial features in the replacement image frame is further based on positions indicated by a portion of the audio content that is associated with the replaced image frame.

8. The computer-implemented method of claim 7, further comprising performing a sound recognition analysis on the portion of the audio content to determine one or more sounds spoken by the person.

9. The computer-implemented method of claim 8, wherein the positions indicated by the portion of the audio content comprise lip positions associated with the one or more sounds.

10. The computer-implemented method of claim 7, further comprising using the portion of the audio content associated with the replaced image frame to predict contents of a future image frame that is subsequent to the replaced image frame.

11. The computer-implemented method of claim 9, wherein output from a machine learning model indicates a correlation between the sounds spoken by the person and the lip positions.

12. The computer-implemented method of claim 5, wherein the generating of the replacement image frame further comprises assigning visual characteristics to the replacement image frame based at least in part on a most recently received one of the played image frames that precedes the replaced image frame in the first video content.

13. The computer-implemented method of claim 5, wherein the generating of the replacement image frame further comprises rendering the facial features in the replacement image frame based at least in part on the information obtained from the replaced image frame.

14. The computer-implemented method of claim 5, further comprising determining, based at least in part on a reduction in bandwidth associated with the replaced image frame, to replace the replaced image frame with the replacement image frame.

15. The computer-implemented method of claim 5, wherein the facial features comprise points on the face of the person.

16. One or more non-transitory computer-readable storage media having stored thereon computing instructions that, upon execution by one or more computing devices, cause the one or more computing devices to perform operations comprising:
receiving, over one or more networks, played image frames included in first video content, wherein the first video content further includes a replaced image frame, and wherein the played image frames and the replaced image frame include a face of a person;
receiving, over the one or more networks, location data that indicates locations of facial features of the face of the person within the replaced image frame, wherein location tracking of facial features in the first video content is performed based on an object recognition analysis;
generating a replacement image frame, wherein the generating of the replacement image frame comprises rendering the facial features in the replacement image frame based at least in part on the locations indicated by the location data that is generated for the replaced frame based on the object recognition analysis; and
playing second video content including the played image frames and the replacement image frame, wherein the replacement image frame replaces the replaced image frame in the second video content.

17. The one or more non-transitory computer-readable storage media of claim 16, wherein the operations further comprising receiving, over the one or more networks, audio content including audio corresponding to the first video content.

18. The one or more non-transitory computer-readable storage media of claim 17, wherein the rendering of the facial features in the replacement image frame is further based on positions indicated by a portion of the audio content that is associated with the replaced image frame.

19. The one or more non-transitory computer-readable storage media of claim 18, further comprising performing a sound recognition analysis on the portion of the audio content to determine one or more sounds spoken by the person.

20. The one or more non-transitory computer-readable storage media of claim 16, wherein the generating of the replacement image frame further comprises assigning visual characteristics to the replacement image frame based at least in part on a most recently received one of the played image frames that precedes the replaced image frame in the first video content.

* * * * *